United States Patent
Veeramasuneni et al.

(10) Patent No.: US 6,409,824 B1
(45) Date of Patent: Jun. 25, 2002

(54) GYPSUM COMPOSITIONS WITH ENHANCED RESISTANCE TO PERMANENT DEFORMATION

(75) Inventors: Srinivas Veeramasuneni; Qiang Yu, both of Grayslake; Michael P. Shake, Oak Lawn, all of IL (US)

(73) Assignee: United States Gypsum Company, Libertyville, IL (US)

( * ) Notice: Subject to any disclaimer, the term of this patent is extended or adjusted under 35 U.S.C. 154(b) by 0 days.

(21) Appl. No.: 09/557,721

(22) Filed: Apr. 25, 2000

(51) Int. Cl.⁷ .............................................. C04B 11/00
(52) U.S. Cl. ...................................... 106/772; 106/776
(58) Field of Search ................................ 106/772, 773, 106/774, 776

(56) References Cited

U.S. PATENT DOCUMENTS

| | | |
|---|---|---|
| 3,573,947 A | 4/1971 | Kinkade et al. |
| 3,663,252 A * | 5/1972 | Stiglitz et al. |
| 3,925,456 A | 12/1975 | Plöger et al. |
| 3,941,772 A | 3/1976 | Plöger et al. |
| 3,947,285 A | 3/1976 | Jones et al. |
| 3,960,888 A | 6/1976 | Plöger et al. |
| 4,060,586 A | 11/1977 | Sardisco et al. |
| 4,225,361 A | 9/1980 | Joseph |
| 4,243,637 A | 1/1981 | Bradford et al. |
| 4,260,422 A | 4/1981 | Thamm et al. |
| 4,267,108 A | 5/1981 | Blum et al. |
| 4,284,614 A | 8/1981 | Ore |
| 4,285,842 A | 8/1981 | Herr |
| 4,311,554 A | 1/1982 | Herr |
| 4,332,746 A | 6/1982 | Thamm et al. |
| 4,341,560 A | 7/1982 | Saito et al. |
| 4,352,719 A | 10/1982 | Herr |
| 4,376,653 A | 3/1983 | Wynn et al. |
| 4,401,473 A * | 8/1983 | Kleiner et al. .............. 423/555 |
| 4,411,701 A | 10/1983 | Saito et al. |
| 4,424,196 A | 1/1984 | Palmer et al. |
| 4,452,770 A | 6/1984 | Palmer et al. |
| 4,466,835 A * | 8/1984 | Crump et al. |
| 4,468,252 A * | 8/1984 | Crump et al. |
| 4,500,356 A * | 2/1985 | Crump et al. |
| 4,514,326 A | 4/1985 | Sallay |
| 4,740,527 A | 4/1988 | von Bonin |
| 4,818,506 A | 4/1989 | Lin et al. |
| 4,834,955 A | 5/1989 | Mouché et al. |
| 4,911,759 A * | 3/1990 | Ohi et al. |
| 4,931,189 A | 6/1990 | Dhawan et al. |
| 4,943,399 A | 7/1990 | Taubitz et al. |
| 4,994,485 A | 2/1991 | Dolman et al. |
| 5,010,124 A | 4/1991 | Olsson et al. |
| 5,034,056 A | 7/1991 | von Bonin |
| 5,198,444 A | 3/1993 | Clough et al. |
| 5,246,677 A | 9/1993 | Moser et al. |
| 5,246,679 A | 9/1993 | Moser et al. |
| 5,320,672 A | 6/1994 | Whalen-Shaw |
| 5,336,316 A | 8/1994 | Dawson et al. |
| 5,458,195 A | 10/1995 | Totten et al. |
| 5,503,672 A * | 4/1996 | Barlet-Gouedard et al. . 106/819 |
| 5,560,774 A | 10/1996 | Burge et al. |
| 5,569,324 A | 10/1996 | Totten et al. |
| 5,631,312 A | 5/1997 | Takada et al. |
| 5,633,310 A | 5/1997 | Sulser et al. |
| 5,788,857 A | 8/1998 | Yang et al. |
| 5,837,049 A * | 11/1998 | Watson et al. .............. 106/427 |
| 5,837,621 A | 11/1998 | Kajander |
| 5,879,825 A | 3/1999 | Burke et al. |
| 5,972,434 A | 10/1999 | Kajander |

FOREIGN PATENT DOCUMENTS

| | | |
|---|---|---|
| DE | 2010679 | * 11/1970 |
| JP | 05009049 | * 1/1993 |
| JP | 06042281 | * 2/1994 |

\* cited by examiner

*Primary Examiner*—Paul Marcantoni
(74) *Attorney, Agent, or Firm*—John M. Lorenzen; David F. Janci; Leydig, Voit & Mayer, Ltd.

(57) ABSTRACT

A set gypsum-containing composition is disclosed. In one aspect, the set gypsum-containing composition includes an interlocking matrix of the set gypsum formed from at least calcined gypsum, water, and an enhancing material. The enhancing material can be selected from (i) an organic polyphosphonic compound, or a mixture thereof; (ii) a borate selected from ulexite colemanite, or a mixture thereof; or a mixture of (i) and (ii). In another aspect, the set gypsum-containing composition is treated with an enhancing material which can be selected from (i) an organic phosphonic compound or a mixture thereof; (ii) a borate selected from ulexite, colemanite, or a mixture thereof; (iii) a carboxylic compound or a mixture thereof; or a mixture of (i), (ii) and/or (iii).

53 Claims, No Drawings

GYPSUM COMPOSITIONS WITH ENHANCED RESISTANCE TO PERMANENT DEFORMATION

TECHNICAL FIELD OF THE INVENTION

The present invention relates generally to gypsum compositions. More particularly, the invention relates to set gypsum compositions that exhibit enhanced resistance to permanent deformation.

BACKGROUND OF THE INVENTION

Set gypsum (calcium sulfate dihydrate) is a well-known material that is included commonly in many types of products. By way of example, set gypsum is a major component of end products created by the use of traditional plasters (e.g., plaster-surfaced internal building walls) and also in paper-faced gypsum boards employed in typical drywall construction of interior walls and ceilings of buildings. In addition, set gypsum is the major component of gypsum/cellulose fiber composite boards and products, and also is included in products that fill and smooth the joints between edges of gypsum boards. Also, many specialty materials, such as materials useful for modeling and mold-making that are precisely machined, produce products that contain major amounts of set gypsum.

Typically, such gypsum-containing products are prepared by forming a mixture of calcined gypsum (calcium sulfate hemihydrate and/or calcium sulfate anhydrite) and water (and other components, as appropriate). The mixture is cast into a desired shape or onto a surface, and then allowed to harden to form set (i.e., rehydrated) gypsum by reaction of the calcined gypsum with the water to form a matrix of crystalline hydrated gypsum (calcium sulfate dihydrate). It is the desired hydration of the calcined gypsum that enables the formation of an interlocking matrix of set gypsum crystals, thus imparting strength to the gypsum structure in the gypsum-containing product. Mild heating is utilized to drive off the remaining free (i.e., unreacted) water to yield a dry product.

One problem with such gypsum-containing products is that they often are subject to permanent deformation (e.g., sag), especially under conditions of high humidity, temperature, or load. For example, the possibility of sag is particularly problematic where gypsum-containing boards and tiles are stored or employed in a manner in which they are positioned horizontally. In this respect, if the set gypsum matrix in these products is not sufficiently resistant to permanent deformation, the products may start to sag in areas between the points to which they are fastened, or supported by, an underlying structure. This can be unsightly and can cause difficulties during use of the products. Furthermore, in many applications, gypsum-containing products must be able to carry loads, e.g., insulation or condensation loads, without perceptible sag.

Another problem with such set gypsum-containing products is that dimensional stability can be compromised during their manufacture, processing, and commercial application. For example, in the preparation of set gypsum products, there is usually a significant amount of free (i.e., unreacted) water left in the matrix after the gypsum has set. Upon drying of the set gypsum in order to drive off the excess water, the interlocking set gypsum crystals in the matrix tend to move closer together as the water evaporates. In this respect, as the water leaves the crystal interstices of the gypsum matrix, the matrix tends to shrink from natural forces of the set gypsum that were resisting capillary pressure applied by the water on the gypsum crystals. As the amount of water in the aqueous calcined gypsum mixture increases, lack of dimensional stability becomes more of a problem.

Dimensional stability is also of concern even after the final dried product is realized, especially under conditions of changing temperature and humidity where set gypsum is susceptible to, for example, expansion and shrinkage. For example, moisture taken up in crystal interstices of a gypsum matrix of a gypsum board or tile exposed to high humidity and temperature can aggravate a sagging problem by causing the humidified board to expand.

If such dimensional instability could be avoided or minimized, various benefits would result. For example, existing gypsum board production methods would yield more product if the boards did not shrink during drying, and gypsum-containing products desired to be relied upon to hold a precise shape and dimensional proportions (e.g., for use in modeling and mold making) would serve their purposes better.

Accordingly, it will be appreciated from the foregoing that there is a need in the art for a set gypsum composition exhibiting enhanced resistance to permanent deformation (e.g., sag) and enhanced dimensional stability. The invention provides such a set gypsum composition satisfying at least one of these needs. These and other advantages of the present invention, as well as additional inventive features, will be apparent from the description of the invention provided herein.

BRIEF SUMMARY OF THE INVENTION

The present invention provides a set gypsum composition that demonstrates enhanced resistance to permanent deformation (e.g., sag) and/or enhanced dimensional stability.

In one aspect, the present invention provides a set gypsum-containing composition comprising an interlocking matrix of set gypsum formed from, i.e., using, at least calcined gypsum, water, and an enhancing material comprising (i) an organic polyphosphonic compound, or a mixture of such compounds; (ii) a borate selected from ulexite, colemanite, or a mixture of ulexite and colemanite; or a mixture of one or more organic polyphosphonic compounds and one or more borates. In some embodiments, the present invention provides for the introduction of borate enhancing material into the set gypsum-containing composition by means other than its direct addition to the aforesaid aqueous composition. For example, the borate may be carried on an accelerator material. In this respect, the borate may be introduced into the aqueous composition in the form of a milled mixture of borate and an accelerator material, particularly, calcium sulfate dihydrate (e.g., gypsum seeds).

In another aspect, the present invention provides a set gypsum-containing composition comprising an interlocking matrix of set gypsum formed from, i.e., using, at least calcined gypsum, water, and an enhancing material comprising (i) a polycarboxylic compound or a mixture of polycarboxylic compounds; and (ii) a polyphosphate compound or a mixture of polyphosphate compounds. In a further aspect of the invention, the polycarboxylic compounds or polyphosphate compounds, alone or in combination, can be used with the organic polyphosphonic compounds or the borates described above, or both.

In yet another aspect, the present invention provides a set gypsum-containing composition comprising set gypsum (e.g., an interlocking set gypsum matrix). The set gypsum is treated in a post-set treatment process with an enhancing material which can be selected from (i) an organic phosphonic compound or a mixture of such compounds; (ii) a borate selected from ulexite, colemanite, or a mixture of ulexite and colemanite; (iii) a carboxylic compound or a mixture of such compounds; or a mixture of (i), (ii) and/or (iii). The set gypsum product need not be dry when post-set treated, although it can be. In the post-set treatment aspect of the present invention, an inorganic phosphate compound also can be used in combination with one or more of the other aforementioned enhancing materials.

In still another aspect, the present invention provides an accelerator for an aqueous calcined gypsum composition comprising a borate and an accelerator material.

The invention may best be understood with reference to the following detailed description of the preferred embodiments.

DETAILED DESCRIPTION OF THE INVENTION

The present invention provides a set gypsum-containing composition that exhibits enhanced resistance to permanent deformation (e.g., sag) and/or enhanced dimensional stability. By way of example, the set gypsum-containing composition can be in the form of gypsum board.

The set gypsum-containing composition comprises an interlocking set gypsum matrix and is prepared from a mixture (e.g., slurry or suspension) comprising water and calcined gypsum. The calcined gypsum can be fibrous or non-fibrous. Preferably, a major portion (e.g., at least 50 wt. %) of the calcined gypsum is non-fibrous. In some embodiments, the calcined gypsum consists essentially of non-fibrous calcined gypsum. In addition, the calcined gypsum can be in the form of alpha calcium sulfate hemihydrate, beta calcium sulfate hemihydrate, water-soluble calcium sulfate anhydrite, or mixtures thereof. In some embodiments, a major portion (e.g., at least 50 wt. %) of the calcined gypsum. is beta calcium sulfate hemihydrate. In some embodiments, the calcined gypsum consists essentially of beta calcium sulfate hemihydrate.

In accordance with the present invention, one or more enhancing materials is provided to impart the set gypsum-containing composition with enhanced sag resistance and/or dimensional stability. By way of example, the resistance to sag imparted by the enhancing materials advantageously provides the set gypsum-containing composition with a more stable form over time. For example, the sag resistance imparted by the enhancing material is beneficial in overcoming the presence of certain salts (e.g., chloride salts) that may be present as impurities in the aqueous calcined gypsum mixture and which might otherwise lead to sag during use. In addition, the enhanced dimensional stability (e.g., resistance to shrinkage) imparted by the enhancing materials is beneficial, for example, in resisting drying stresses, and hence shrinkage, during preparation, as well as in resisting dimensional expansion in operation.

In some embodiments, the enhancing material is present in the aqueous mixture of calcined gypsum during the hydration of the calcined gypsum to form set gypsum (i.e., a pre-set treatment). In some pre-set treatment embodiments, suitable enhancing materials include, for example, (i) an organic polyphosphonic compound, or a mixture thereof; (ii) a borate selected from ulexite, colemanite, or a mixture thereof; or a mixture of (i) and (ii). In addition, such embodiments optionally can include a second enhancing material selected from, for example, (iii) a polycarboxylic compound or a mixture thereof; (iv) a polyphosphate compound or a mixture thereof; or a mixture of (iii) and (iv). It will be appreciated by those skilled in the art that various combinations and permutations of the enhancing agents of the four groups (i)–(iv) of enhancing materials can be used in the practice of the present invention.

In some pre-set treatments according to the invention, the enhancing material mixed into the aqueous calcined gypsum mixture includes (i) a polycarboxylic compound or a mixture of polycarboxylic compounds; and (ii) a polyphosphate compound or a mixture of polyphosphate compounds.

In embodiments where the enhancing material is included in, or added to, the aqueous mixture of calcined gypsum during the hydration of the calcined gypsum to form set gypsum, the enhancing material can be included at any suitable time, and in a variety of forms. By way of example, the enhancing material conveniently can be included in, or added to, the aqueous mixture, for example, prior to or when the water and calcined gypsum are normally brought together for mixing (e.g., in a mixing apparatus). Another possibility is to mix the enhancing material with raw gypsum even before it is heated to form calcined gypsum, so that the enhancing material is already present when the calcined gypsum is mixed with water to cause rehydration.

In addition, the enhancing material can be provided (e.g., by spraying) onto the already-mixed aqueous mixture of calcined gypsum after it is deposited onto a cover sheet (e.g., on a moving belt). Generally, a second cover sheet is then placed over the deposited mixture. In this manner, the solution of enhancing material will soak into the deposited mixture and be present when the bulk of the hydration to form set gypsum occurs.

Other alternative methods of providing the enhancing material will be apparent to those of ordinary skill in the art and are considered within the scope of the invention. For example, one or both of the cover sheets can be pre-coated with the enhancing material, for example, so that the enhancing material will dissolve and migrate through the mixture when the deposit of the aqueous mixture of calcined gypsum contacts the coated cover sheet.

In some embodiments where the borate is selected, at least some of the borate may be mixed and subsequently milled with an accelerator material prior to introduction of the resulting milled mixture into the aqueous composition. In such embodiments, the accelerator material, i.e., calcium sulfate dihydrate, and the borate are mixed and then milled. While not desiring to be bound to any particular theory, it is believed that upon milling, the borate becomes affixed to the outer surface of the calcium sulfate dihydrate accelerator material, providing at least a partial coating layer on the material. Regardless of theory, however, the borate and accelerator combination, after milling, desirably functions as an accelerator, and also provides the resulting gypsum product with enhanced sag resistance. The presence of the borate as an at least partial coating on the accelerator material desirably protects the activity of the accelerator by minimizing adverse interactions of the active sites of the accelerator with moisture (e.g., during storage), thereby avoiding the need and associated expense of an additional coating material (e.g., sugar or boric acid). Ulexite and colemanite are naturally occurring borates and are obtainable at much less expense than synthetic materials such as boric acid.

Advantageously, the borate-accelerator material mixture is milled under conditions sufficient to provide the resulting milled accelerator composition with a median particle size of less than about 5 $\mu$m. Preferably, the milled composition further has a surface area of at least about 7,000 cm²/gram. A general procedure for effecting milling is provided in U.S. Pat. No. 3,573,947, although heating is not necessary in some embodiments of the invention to make the borate coated accelerator described herein. The resulting milled accelerator mixture then may be added to the aqueous calcined gypsum mixture in an amount effective to maintain control of the rate of conversion of the calcined gypsum mixture to set gypsum at the desired level. Of the borates, ulexite and colemanite are particularly well suited for this mode of introduction, with the former being most preferred.

In some embodiments, the enhancing material is provided by treating the already-formed (or partially formed) set gypsum-containing composition comprising the set gypsum (i.e., a post-set treatment). In such embodiments, suitable enhancing materials include, for example, (i) an organic phosphonic compound, or a mixture thereof; (ii) a borate selected from ulexite, colemanite, or a mixture thereof; (iii) a carboxylic compound or a mixture thereof; or mixtures of (i), (ii) and/or (iii). Optionally, such embodiments can include a second enhancing material selected from, for example, a phosphate compound, or a mixture thereof.

The treatment of the set gypsum-containing composition with the enhancing material can occur before or after the set gypsum composition is dried (e.g., in an oven or kiln) to drive off free (i.e., unreacted) water. In this respect, the enhancing material is applied (e.g., sprayed or soaked in a solution such as an aqueous solution containing, for example, from about 0.01% to about 2% of enhancing material) onto the set gypsum-containing composition in order to achieve the desired treatment. Preferably, the treatment is applied prior to drying of the set gypsum-containing composition. If the treatment is applied after drying of the set gypsum-containing composition, the set gypsum-composition preferably is re-dried after application of the treatment (e.g., with the set gypsum-containing composition optionally re-exposed to water, such as, for example, by way of soaking). Desirably, the enhancing material will migrate to the set gypsum composition, even through conventional paper sheets used in the processing of set gypsum.

It is noteworthy that, pursuant to the invention, the enhancing material can be added to the aqueous calcined gypsum mixture prior to the formation of some of the set gypsum and, at the same time, also as a treatment after the formation of portions of set gypsum. In this respect, a pre-set treatment and post-set treatment can occur at the same time according to the invention. For example, addition of the enhancing material during setting (e.g., while only some of the set gypsum has formed) would be a pre-set treatment with respect to portions where the set gypsum has yet to form and would be a post-set treatment with respect to portions where the set gypsum has formed.

It should be appreciated that combinations of the various approaches to introducing the enhancing material into the final set gypsum product, e.g., combinations of pre-set (e.g., milling with an accelerator and/or dry addition) and/or post-set treatments (in various combinations of one or more enhancing materials) to provide the various advantages described herein are intended to be included within the scope of the present invention.

The enhancing material can be included in any suitable amount. By way of example, the amount of enhancing material preferably is selected to obtain the advantages of the present invention, e.g., an amount sufficient to impart a desired sag resistance and/or dimensional stability to the set gypsum composition. In this respect, the effective amount of enhancing material will vary, for example, depending upon the amount of impurities, e.g., chloride anions or the like, in the calcined gypsum raw material, as well as the type of enhancing material selected and other factors. For example, in a pre-set treatment, the amount of enhancing material included in, or added to, the aqueous calcined gypsum mixture preferably is from about 0.01% to about 5% by weight of the calcined gypsum, and more preferably, the amount of enhancing material included in, or added to, the aqueous calcined gypsum mixture is from about 0.1% to about 2% by weight of the calcined gypsum. In a post-set treatment, the amount of enhancing material utilized in the practice of the invention preferably is from about 0.01% to about 5% by weight of the gypsum, and more preferably, from about 0.1% to about 2% by weight of the gypsum.

The enhancing material can be delivered in a pre-set or post-set treatment by, for example, a solution (e.g., aqueous) comprising the enhancing material and/or as a dry additive. In the case of delivery of enhancing material via a solution, the concentration of the enhancing material in the solution is chosen so as to provide the proper amount of enhancing material based upon the weight of calcined gypsum or set gypsum being treated as indicated above. With respect to a post-set treatment, the treating solution preferably also has sufficient water to thoroughly wet the set gypsum (e.g., to uniformly distribute the enhancing material throughout the gypsum matrix).

Referring now to the enhancing materials, the organic phosphonic compounds (e.g., organic phosphonates or phosphonic acids) of the invention include at least one $RPO_3M_2$ functional group, where M is a cation, phosphorus, or hydrogen, and R is an organic group. The use of an organic polyphosphonic compound is preferred for both pre-set and post-set treatments, although an organic monophosphonic compound can be utilized in post-set treatments according to the invention. The preferred organic polyphosphonic compounds include at least two phosphonate salt or ion groups, at least two phosphonic acid groups, or at least one phosphonate salt or ion group and at least one phosphonic acid group. A monophosphonic compound useful in a post-set treatment according to the invention includes one phosphonate salt or ion group or at least one phosphonic acid group.

Inclusion of organic phosphonic compounds as an enhancing material is beneficial because such compounds have been found to impart sag resistance to the set gypsum-containing compositions according to the invention, such as, for example, under humidified conditions. In addition, the inclusion of the organic phosphonic compounds also enhances dimensional stability because it is believed, for example, that the organic phosphonic compounds aid in the binding of crystals in the set gypsum matrix.

Notably, the organic group of the organic phosphonic compounds is bonded directly to the phosphorus (i.e., without an oxygen in between). By way of example, the organic phosphonic compounds suitable for use in the invention include, but are not limited to, compounds characterized by the following structures:

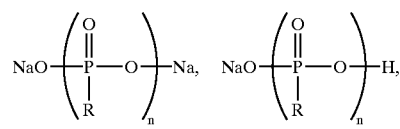

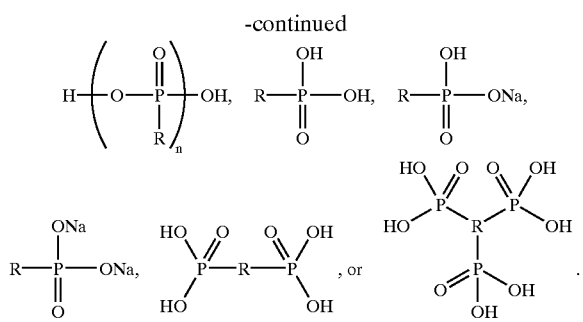

In these structures, R refers to an organic moiety containing at least one carbon atom bonded directly to a P atom, and n is a number of from about 1 to about 1,000, preferably a number of from about 2 to about 50.

Organic phosphonic compounds include, for example, aminotri (methylene-phosphonic acid), aminotri (methylene-phosphonic acid) pentasodium salt, 1-hydroxyethylidene-1,1-diphosphonic acid, 1-hydroxyethylidene-1,1-diphosphonic acid tetrasodium salt, diethylenetriamine penta(methylene phosphonic acid) pentasodium salt, diethylenetriamine penta(methylene phosphonic acid) trisodium salt, hexamethylene diamine tetra (methylene phosphonic acid), hexamethylene diamine tetra (methylene phosphonic acid) potassium salt, or the like. In some embodiments, DEQUEST® phosphonates (e.g., DEQUEST® 2000, DEQUEST® 2006, DEQUEST® 2016, DEQUEST® 2054, DEQUEST® 2060S, DEQUEST® 2066A, and the like), commercially available from Solutia, Inc., St. Louis, Mo., are utilized in the invention. Other examples of suitable organic phosphonic compounds are found, for example, in U.S. Pat. No. 5,788,857.

If included in the aqueous calcined gypsum mixture in a pre-set treatment, the amount of organic phosphonic compound utilized in the practice of the invention to prepare the mixture preferably is from about 0.01% to about 1% by weight of the calcined gypsum, and more preferably, from about 0.05% to about 0.2% by weight of the calcined gypsum. In a post-set treatment, the amount of organic phosphonic compound utilized in the practice of the invention and that is delivered to the set gypsum composition preferably is from about 0.01% to about 1% by weight of the gypsum, and more preferably, from about 0.05% to about 0.2% by weight of the gypsum. For example, the organic phosphonic compound can be delivered to the set gypsum composition by a solution (e.g., aqueous) comprising the organic phosphonic compound.

Carboxylic compounds also are suitable for use as an enhancing material in the present invention. Preferably, the carboxylic compounds are soluble in water. The use of a polycarboxylic compound is preferred, although a monocarboxylic compound can be utilized in post-set treatments according to the invention. In this respect, a polycarboxylic compound includes at least two carboxylate salt or ion groups, at least two carboxylic acid groups, or at least one carboxylate salt or ion group and at least one carboxylic acid group. A monocarboxylic compound useful in a post-set treatment according to the invention includes one carboxylate salt or ion group, or at least one carboxylic acid group.

Inclusion of carboxylic compounds as an enhancing material is beneficial because the carboxylic compounds have been found to impart sag resistance to the set gypsum-containing compositions according to the invention, such as, for example, under humidified conditions. In addition, the inclusion of the carboxylic compounds also enhances dimensional stability because it is believed, for example, that the carboxyl groups aid in the binding of crystals in the set gypsum matrix. By way of example, and not in limitation of the invention, the polycarboxylic compound can be in the form of a polyacrylate, a polymethacrylate, a polyethacrylate, and the like. In a post-set treatment, the carboxylic compound additionally can be in the form of a citrate (e.g., salts, such as, for example, sodium citrate).

In a pre-set treatment, the polycarboxylic compounds suitable for use in the present invention preferably have a molecular weight of from about 100,000 daltons to about 1 million daltons. Polycarboxylic compounds of higher molecular weight are less desirable because the viscosity is too high, while those of lower molecular weight (progressively decreasing below 100,000 daltons) are less effective. In some embodiments of a pre-set treatment, the polycarboxylic compound has a molecular weight of from about 200,000 daltons to about 700,000 daltons, such as, for example, a molecular weight of from about 400,000 daltons to about 600,000 daltons. In some embodiments, the carboxylic compound is a polyacrylate, in which case the polyacrylate preferably has a molecular weight of from about 200,000 daltons to about 700,000 daltons, more preferably about 10 400,000 daltons to about 600,000 daltons.

In a post-set treatment, the carboxylic compound preferably has a molecular weight of from about 200 daltons to about 1,000,000 daltons. For example, in some embodiments of a post-set treatment, the carboxylic compound has a molecular weight of from about 200 daltons to about 100,000 daltons (e.g., from about 1,000 daltons to about 100,000 or from about 10,000 daltons to about 100,000 daltons), while in other embodiments, the carboxylic compound has a molecular weight of from about 100,000 daltons to about 1 million daltons (e.g., from about 200,000 daltons to about 700,000 or from about 400,000 daltons to about 600,000 daltons).

If included in the aqueous calcined gypsum mixture in a pre-set treatment, the amount of carboxylic compound utilized in the practice of the invention to prepare the mixture preferably is from about 0.01% to about 5% by weight of the calcined gypsum, and more preferably, from about 0.05% to about 2% by weight of the calcined gypsum. In a post-set treatment, the amount of carboxylic compound utilized in the practice of the invention and that is delivered to the set gypsum composition preferably is from about 0.01% to about 5% by weight of the gypsum, and more preferably, from about 0.05% to about 2% by weight of the gypsum. For example, the carboxylic compound can be delivered to the set gypsum composition by a solution (e.g., aqueous) comprising the carboxylic compound.

Borates, and in particular, naturally occurring ulexite ($NaCaB_5O_9 \cdot 8H_2O$) and colemanite ($Ca_2B_6O_{11} \cdot 5H_2O$), or mixtures of ulexite and colemanite, also can be included as the enhancing material. In some embodiments, ulexite is preferred, in part, due to its relatively low cost. Notably, the borates are not fully soluble in water. Surprisingly, even such semi-soluble borates, which are polyboron compounds, produce the desired degree of effects in accordance with the present invention. This is even more surprising because other fully soluble boron-containing materials such as boric acid, which is a monoboron compound, produce much less of the desired effects and are not suitable for use within the scope of the invention. Inclusion of these borates as enhancing materials is beneficial because it has been found that they impart sag resistance to set gypsum-containing materials, even in the presence of impurities, e.g., chlorides, In the aqueous calcined gypsum mixture. This discovery is significant, as it permits lower, and less expensive, grades of calcined gypsum to be used in the production of set gypsum products, such as wall board, without any significant negative effect on sag resistance. Further, the borates do not significantly retard the formation of the set gypsum-containing composition.

In the pre-set treatment method, borate can be added to the aqueous calcined gypsum mixture as a powder and/or as a solution (e.g., an aqueous solution). In some embodiments, for example, the borate can be added after it is milled with calcium sulfate dihydrate accelerator, as previously described. Also, in some embodiments, the borate is added using both techniques.

If included in the aqueous calcined gypsum mixture in a pre-set treatment, the amount of borate added to the mixture in the practice of the invention preferably is from about 0.1% to about 2% by weight of the calcined gypsum, and more preferably, from about 0.2% to about 0.5% by weight of the calcined gypsum. In a post-set treatment, the amount of borate used to treat the set gypsum in the practice of the invention preferably is from about 0.1% to about 2% by weight of the gypsum and more preferably, from about 0.2% to about 0.5% by weight of the gypsum. For example, the borate can be delivered to the set gypsum composition by a solution (e.g., aqueous) comprising the borate.

In addition, and in keeping with the invention, inorganic phosphates can be combined with the other enhancing materials described herein. In particular, inorganic polyphosphate compounds are preferred, although an inorganic monophosphate compound can be utilized in post-set treatments according to the invention. In this respect, the inorganic polyphosphates are selected from, for example, condensed phosphoric acids, each of which comprises two or more phosphoric acid units, salts or ions of condensed phosphates, each of which comprises two or more phosphate units, or compounds including one or more phosphoric acid units and one or more phosphate salt or ion units. A monophosphate compound useful in a post-set treatment according to the invention includes one phosphoric acid unit or one phosphate salt or ion unit.

The inclusion of such inorganic phosphates further enhances sag resistance and, with respect to post-set treatments, other mechanical strength (e.g., compressive strength) of the set gypsum-containing composition. In some embodiments, the inorganic phosphates are in the form of the following salts or the anionic portions thereof: a trimetaphosphate compound (e.g., salts such as, for example, sodium trimetaphosphate, calcium trimetaphosphate, sodium calcium trimetaphosphate, potassium trimetaphosphate, lithium trimetaphosphate, or the like), sodium hexametaphosphate having 6–27 repeating phosphate units, ammonium polyphosphate having 500–3000 (preferably,1000–3000) repeating phosphate units, tetrapotassium pyrophosphate, trisodium dipotassium tripolyphosphate, sodium tripolyphosphate, tetrasodium pyrophosphate, sodium acid pyrophosphate, or polyphosphoric acid having 2 or more repeating phosphoric acid units. In some embodiments, the inorganic phosphate compound includes sodium trimetaphosphate and/or ammonium polyphosphate. Examples of monophosphate compounds (also referred to as orthophosphate compounds) useful in post-set treatment embodiments are monosodium dihydrogen phosphate, monopotassium dihydrogen phosphate, and phosphoric acid.

If included in the aqueous calcined gypsum mixture in a pre-set treatment, the amount of such inorganic phosphates utilized in the practice of the invention or added to the mixture preferably is from about 0.004% to about 2% by weight of the calcined gypsum, and more preferably, from about 0.04% to about 0.16% by weight of the calcined gypsum. In a post-set treatment, the amount of such inorganic phosphates utilized in the practice of the invention preferably is from about 0.004% to about 2% by weight of the gypsum, and more preferably, from about 0.04% to about 0.16% by weight of the gypsum. For example, the inorganic phosphate can be delivered to the set gypsum composition by solution (e.g., aqueous) comprising the phosphate.

In addition, to the extent that any of the enhancing materials retard the hydration rate of formation of set gypsum (and adversely affect the strength of the set gypsum-containing composition), such as, for example, with respect to organic phosphonic compounds, carboxylic compounds, or phosphates (other than ammonium polyphosphate or a trimetaphosphate compound), any such retardation can be ameliorated or even overcome by including in the mixture an accelerator, particularly calcium sulfate dihydrate. Of course, other accelerators commonly known in the art such as, aluminum sulfate, sodium bisulfate, zinc sulfate, and the like can also be included.

In accordance with the present invention, the set gypsum-containing composition of the invention can be in the form of a gypsum board which preferably has a sag resistance, as determined according to ASTM C473-95, of less than about 0.1 inch (≈0.254 cm) per two ft. (≈0.61 m) length of said board. In addition, the gypsum board preferably exhibits a shrinkage during the preparation thereof (e.g., when the set gypsum-containing compound is dried) of less than about 0.02 inch (≈0.051 cm) per four foot (≈1.22 m) width and less than about 0.05 inch (≈0.127 cm) per twelve foot (≈3.66 m) length.

The gypsum composition can also include optional additives, such as, but not limited to, a reinforcing additive, a binder (e.g., polymers such as latex), expanded perlite, air voids formed by an aqueous foam, a starch such as a pregelatinized starch, accelerator agents, retarding agents, water resistance agents, bactericides, fungicides, biocides, a fibrous mat (e.g., on a gypsum board comprising the inventive gypsum composition), as well as other additives as will be appreciated by one of ordinary skill in the art, or combinations thereof.

The reinforcing additive can be included in the inventive gypsum composition, if desired, in order to enhance strength during processing. For example, the reinforcing additive can include cellulosic fibers (e.g., paper fibers), mineral fibers, other synthetic fibers, or the like, or combinations thereof. The reinforcing additive, such as paper fibers, can be provided in any suitable amount. For example, in some embodiments, the reinforcing additive is present in an amount of from about 0.1% to about 5% percent by weight of the set gypsum composition.

To facilitate a decrease in density, the set gypsum composition of the invention optionally can include air voids formed by aqueous foam. In particular, a foaming agent can be added to the aqueous calcined gypsum mixture during preparation. It is desirable for a major part of the foaming agent to generate foam that is relatively unstable when in contact with the aqueous calcined gypsum slurry. Also, a minor part of the foaming agent desirably generates relatively stable foam. By way of example, in some embodiments, the aqueous foam is formed from at least one foaming agent having the formula

$$CH_3(CH_2)_xCH_2(OCH_2CH_2)_yOSO_3^-M^+.$$

Particularly, M is a cation, X is an integer of from 2 to about 20, Y is an integer of from 0 to about 10 and is 0 in at least about 50 weight percent of the at least one foaming agent. Preferably, Y is 0 in from about 86 to about 99 weight percent of the at least one foaming agent.

In addition, the gypsum composition optionally can include a starch, such as a pregelatinized starch or an acid-modified starch. The inclusion of the pregelatinized starch minimizes or avoids the risk of paper delamination under conditions of increased moisture. One of ordinary skill in the art will appreciate methods of pregelatinizing raw starch, such as, for example, cooking raw starch in water at temperatures of at least 185° F. (≈85° C.) or other methods. Suitable examples of pregelatinized starch include, but are not limited to, PCF1000 starch, commercially available from Lauhoff Grain Company and AMERIKOR 818 and HQM PREGEL starches, both commercially available from Archer Daniels Midland Company. If included, the pregelatinized starch can be present in any suitable amount. For example, if included, the pregelatinized starch can be present in an amount of from about 0.1% to about 5% percent by weight of the composition.

The gypsum composition can also include a fibrous mat. The fibrous mat can be woven or nonwoven. Desirably, the fibrous mat is composed of a material that can accommodate the expansion of the gypsum composition during hydration. By way of example, the fibrous mat can be in the form of a paper mat, a fiberglass mat, or other synthetic fiber mat. In some embodiments, the fibrous mat is nonwoven and can include fiberglass. Desirably, the fibrous mat can be applied to the surface and/or be incorporated within the gypsum cast during formation in order to improve the integrity and handling ability of the dried gypsum cast during production, handling, and field application. In addition, the fibrous mat can be utilized as the exposed surface in a final product (e.g., a ceiling tile), and, as such, provides an aesthetically pleasing monolithic appearance that can be desirably smooth. If provided, the fibrous mat can have any suitable thickness. For example, in some embodiments, the fibrous mat has a thickness of from about 0.003 inches (≈0.00762 cm) to about 0.15 inches (≈0.381 cm).

The following examples further illustrate the present invention but, of course, should not be construed as in any way limiting its scope. In the examples described below, the following abbreviations have the indicated meanings:

OPPC denotes an organic polyphosphonic compound;
OPPC1 is aminotri (methylene-phosphonic acid);
OPPC2 is aminotri (methylene-phosphonic acid), pentasodium salt;
OPPC3 is 1-hydroxyethylidene-1,1-diphosphonic acid tetrasodium salt;
OPPC4 is hexamethylenediamine tetra (methylene phosphonic acid), potassium salt;
OPPC5 is diethylenetriamine penta (methylene phosphonic acid);
OPPC6 is diethylenetriamine penta (methylene phosphonic acid), trisodium salt;
PAA denotes a poly(acrylic acid);
PAA1 is a poly(acrylic acid) having a molecular weight of about 2,000 daltons;
PAA2 is a poly(acrylic acid) having a molecular weight of about 30,000 daltons;
PAA3 is a poly(acrylic acid) having a molecular weight of about 250,000 daltons;
PAA4 is a poly(acrylic acid) having a molecular weight of about 450,000 daltons;
PAA5 is a poly(acrylic acid) having a molecular weight of about 750,000 daltons;
PAA6 is Belclene 283 (commercially available from FMC Corporation, Princeton, New Jersey);
PAA7 is Belclene 200 (commercially available from FMC Corporation); and
PAA8 is Belsperse 161 (commercially available from FMC Corporation).

EXAMPLE 1

Resistance To Permanent Deformation (Laboratory Gypsum Board Sag Resistance)

Samples of gypsum-containing boards were prepared in a laboratory in accordance with the invention and compared, in regard to resistance to permanent deformation, with sample boards prepared using methods and compositions outside the scope of the invention.

Samples were prepared by mixing in a 5 liter WARING blender for 10 seconds at low speed: 1.5 kg of beta calcium sulfate hemihydrate; 2 g of a set accelerator comprising fine ground particles of calcium sulfate dihydrate coated with sugar to maintain efficiency and heated as described in U.S. Pat. No. 3,573,947, the disclosure of which is hereby incorporated by reference; 2 liters of tap water; and 0 g additive (control samples), 1.5 g of an organic polyphosphonic compound, or 1.5 g of other additives. The slurries thus formed were cast into trays to prepare flat gypsum board samples, each having dimensions of about 6×24×½ inches. After the calcium sulfate hemihydrate set to form gypsum (calcium sulfate dihydrate), the boards were dried in a 112° F. (≈44.4° C.) oven until their weight stopped changing. The final measured weight of each board was recorded. No paper facing was applied to these boards, in order to avoid the effect of paper covers on the gypsum boards' sag performance under humidified conditions.

Each dried board was then laid in a horizontal position upon two ½-inch-wide supports whose length extended the full width of the board, with one support at each end of the board. The boards remained in this position for a specified period of time (in this example, 4 days) under continuous surrounding conditions of 90° F. (≈32.2° C.) temperature and 90 percent relative humidity. The extent of sag of the board was then determined by measuring the distance (in inches) of the center of the top surface of the board from the imaginary horizontal plane extending between the top edges of the ends of the board. The resistance to permanent deformation of the set gypsum matrix of the board is considered to be inversely proportional to the extent of the sag of the board. Thus, the greater the extent of the sag is, the lower is the relative resistance to permanent deformation of the set gypsum matrix comprising the board.

The tests of resistance to permanent deformation are reported in Table I, including the composition and concentration (weight percent based on the weight of calcium sulfate hemihydrate) of the additive, the final weight of the board, and the extent of measured sag.

In these laboratory experiments, sag deflection was determined according to the ASTM C473-95 Humidified Deflection Test, except that the gypsum boards tested did not include wallboard paper, and except that the boards tested were 0.5 ft. (≈0.154 m)×2 ft. (≈0.61 m), instead of 1 ft. (≈0.305 m) by 2 ft. (≈0.61 m). However, it has been found that the sag deflection of the laboratory prepared boards correlates to the sag deflection of 1 ft. (≈0.305 m) by 2 ft. (≈0.61 m) boards described in the ASTM C 473-95 test and, if there is any difference, the difference will be that the sag deflection is greater in the laboratory prepared boards. As such, if the laboratory prepared boards according to the invention meet desired sag resistance standards, boards according to the invention prepared pursuant to ASTM C 473-95 also will meet desired sag resistance standards.

TABLE I

| Additive | Addition Level Based On wt. % of Calcined Gypsum | Dry Board Weight (gram) | Water Pick-Up from 90/90 Room (wt. %) | Ten Day Humidified Sag Deflection (inches) |
|---|---|---|---|---|
| Control | 0.0 | 536.2 | 0.15 | 0.985 |
| Phosphate Glass | 0.1 | 538.5 | 0.24 | 0.013 |
| Ammonium Polyphosphate | 0.1 | 534.8 | 0.42 | 0.012 |
| Sodium Trimetaphosphate | 0.1 | 531.4 | 0.23 | 0.035 |
| OPPC1 | 0.1 | 539.2 | 0.15 | 0.044 |
| OPPC2 | 0.1 | 537.1 | 0.24 | 0.077 |
| OPPC3 | 0.1 | 536.3 | 0.28 | 0.117 |
| OPPC4 | 0.1 | 541.3 | 0.13 | 0.060 |
| OPPC5 | 0.1 | 551.2 | 0.29 | 0.102 |
| OPPC6 | 0.1 | 515.8 | 0.32 | 1.253 |

The data in Table I illustrates that board prepared using organic polyphosphonic compounds in accordance with the invention was much more resistant to sag (and thus much more resistant to permanent deformation) than the control board. Moreover, board prepared with several of the organic polyphosphonic compounds had a sag that was much less than 0.1 inch (≈0.254 cm) of sag per two foot (≈0.61 m) length of board, and thus not perceptible to the human eye. Other organic polyphosphonic compounds, such as OPPC 3 and OPPC 5, showed a marked improvement in sag when compared to the control.

It will be appreciated that accelerators can be used to some degree to overcome retardation and strength reduction effects that may be caused by the organic polyphosphonic compounds. In the examples illustrated above, no attempt was made to overcome such effects. However, if an accelerator had been added to overcome such effects, then the boards made with any of these organic polyphosphonic compounds would be expected to exhibit a sag of less than 0.1 inch (≈0.254 cm) per two ft. (≈0.61 m) length of board.

EXAMPLE 2

This Example illustrates the use of ulexite as an enhancing material for the improvement of sag resistance in gypsum board. Resistance to permanent deformation using ulexite as an additive per se, and milled with a set accelerator comprising fine ground particles of calcium sulfate dihydrate as described above was determined as described above in Example. 1.

In addition, the beneficial effect of using ulexite, in the presence of a high content of chloride salt impurities, is also illustrated. Gypsum board was prepared as described in Example 1, except that chloride ion was introduced into the mixture along with the ulexite additive. The sag deflection was tested in accordance with the ASTM C 473-95 procedure on laboratory prepared boards as described above.

In these Examples, the amount of ulexite added to the aqueous calcined gypsum slurry by addition in milled mixture with accelerator material is approximately 0.05 wt. % of the calcined gypsum. In the last Example in Table II, the total ulexite added to the aqueous calcined gypsum slurry is approximately 0.15 wt. % of the calcined gypsum (0.05 wt. % in the form of milled mixture with accelerator material plus 0.10 wt. % additionally added).

TABLE II

| Accelerator | Accelerator Level Based on wt. % of Calcined Gypsum | NaCl Addition Based on wt. % of Calcined Gypsum | Dry Board Weight (gram) | Water Pickup from 90/90 Room (wt. %) | Two Week Humidified Sag Deflection (inches) |
|---|---|---|---|---|---|
| Control | 1 | 0 | 511.4 | 0.8 | 0.214 |
| Coated with Ulexite | 1 | 0 | 528.4 | 0.6 | 0.067 |
| Control | 1 | 0.5 | 528.3 | 6.5 | >1 |
| Coated with Ulexite | 1 | 0.5 | 529.4 | 6.1 | 0.235 |
| Coated with Ulexite + Addition of 0.1 wt. % Ulexite (based on weight of calcined gypsum) | 1 | 0.5 | 529.7 | 6.0 | 0.057 |

The data in Table II illustrates the enhancement in sag resistance (provided in terms of sag deflection) obtained when using ulexite, either by the addition of ulexite as a milled mixture of ulexite and calcium sulfate dihydrate as the accelerator or as an independent additive, either a dry powder or aqueous solution. The data also shows that the borate, ulexite, provides sag deflection enhancement even when a significant amount of chloride anion impurities (e.g., NaCl) is present in the aqueous calcined gypsum mixture (which may be present in relatively low quality calcined gypsum), and when the water absorption in the finished gypsum board product is relatively high.

EXAMPLE 3

Post-Set Treatment of Calcium Sulfate Dihydrate

In some alternative preferred embodiments of the present invention, calcium sulfate dihydrate cast is treated with an aqueous solution of an enhancing material to increase resistance to permanent deformation (e.g., sag resistance), and dimensional stability of set gypsum-containing products after redrying. More specifically, treatment of calcium sulfate dihydrate cast with various enhancing materials in accordance with the present invention has been discovered to increase resistance to permanent deformation (e.g., sag resistance) and dimensional stability. Thus, the embodiment wherein the enhancing material is added to set gypsum provides new compositions and methods for making improved gypsum-containing products, including but not limited to, boards, panels, plasters, tiles, gypsum/cellulose fiber composites, etc. Therefore, any gypsum based product which requires strict control over sag resistance will benefit from this embodiment of the present invention.

Two exemplary methods of post treatment of set gypsum are as follows.

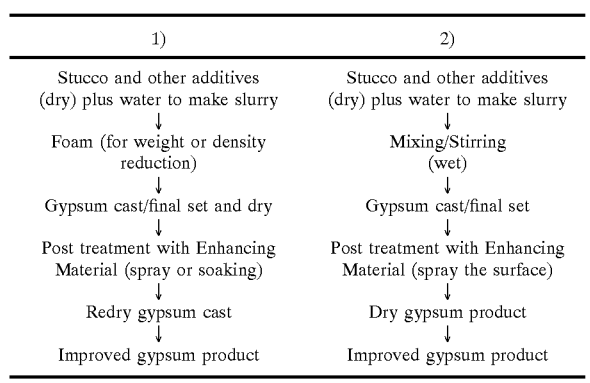

In both of the above methods, the aqueous solution of the enhancing material is preferably applied to the set gypsum.

The enhancing material was sprayed onto the set gypsum composition as a solution of enhancing material in water. The amount of enhancing material in solution is based on the weight of the calcium sulfate dihydrate (set gypsum).

The laboratory prepared boards were prepared as described in Example I, and the ASTM C 473-95 Humidified Sag Deflection Test was carried out in laboratory boards, also as explained above in Example I.

Table III illustrates the improvement in sag deflection achieved when the enhancing material or additive is an organic polyphosphonic compound. Table IV illustrates the improvement of sag deflection achieved when the additive is a poly(acrylic acid). Table V illustrates the improvement of sag deflection achieved when the additive is sodium citrate, a carboxylic compound which includes at least two carboxylate groups.

TABLE III

| Additive | Addition Level based on wt. % of Calcined Gypsum | Dry Board Weight (gram) | Water Pick-Up from 90/90 Room (wt. %) | Two week Humidified Sag Deflection (inches) |
|---|---|---|---|---|
| Control | 0.0 | 572.7 | 0.15 | 0.285 |
| Sodium Trimetaphosphate | 0.2 | 580.7 | 0.19 | 0.011 |
| OPPC1 | 0.2 | 586.9 | 0.24 | 0.021 |
| OPPC2 | 0.2 | 582.5 | 0.22 | 0.029 |
| OPPC3 | 0.2 | 573.9 | 0.26 | 0.045 |
| OPPC4 | 0.2 | 570.7 | 0.25 | 0.014 |

TABLE III-continued

| Additive | Addition Level based on wt. % of Calcined Gypsum | Dry Board Weight (gram) | Water Pick-Up from 90/90 Room (wt. %) | Two week Humidified Sag Deflection (inches) |
|---|---|---|---|---|
| OPPC5 | 0.2 | 606.8 | 0.36 | 0.012 |
| OPPC6 | 0.2 | 583.5 | 0.26 | 0.008 |

The data in Table III illustrates that the application of organic polyphosphonates to set gypsum provides an improvement in the sag deflection of the board. All board exhibited a sag resistance of well below the desired 0.1 inch (≈0.254 cm) per two ft. (≈0.61 m) length of board when the organic polyphosphonates were used in the post-set treatment in accordance with this invention.

TABLE IV

| Additive | Addition Level Based on wt. % of Calcined Gypsum | Dry Board Weight (gram) | Water Pickup from 90/90 Room (wt. %) | Two Week Humidified Sag Deflection (inches) |
|---|---|---|---|---|
| Control | 0.0 | 552.6 | 0.59 | 0.424 |
| PAA1 | 0.2 | 567.5 | 1.2 | 0.043 |
| PAA2 | 0.08 | 541 | 0.7 | 0.081 |
| PAA3 | 0.08 | 551.2 | 0.67 | 0.069 |
| PAA4 | 0.2 | 544.5 | 0.6 | 0.058 |
| PAA5 | 0.2 | 569.9 | 0.3 | 0.161 |
| PAA6 | 0.1 | 552.5 | 0.2 | 0.054 |
| PAA7 | 0.1 | 552.5 | 0.2 | 0.054 |
| PAA8 | 0.1 | 553.6 | 0.5 | 0.026 |

The data in Table IV illustrates that the carboxylates provide enhanced strength to the set gypsum composition in post-set treatment. The data shows that the use of soluble carboxylates, i.e., PAA 1–4 and PAA6 and PAA7 is more beneficial than carboxylates that are not very soluble in water, e.g., PAA5, although even post-treatment with PAA5 provided a board with improved sag resistance compared to the control.

TABLE V

| Additive | Addition Level Based on wt % of Calcined Gypsum | Dry Board Weight (gram) | Water Pickup from 90/90 Room (wt. %) | Two Week Humidified Sag Deflection (inches) |
|---|---|---|---|---|
| Control | 0.0 | 519.4 | .3 | 1.5 |
| Sodium Citrate | 0.2 | 569.1 | 0.4 | 0.173 |

Table V illustrates the unexpected benefits of post-set treatment. Sodium citrate is ordinarily considered a retarder of set gypsum, and its use adversely affects strength and sag resistance when it is used as a pre-treatment additive. However, as a post-set treatment, it has been found that sodium citrate increases sag resistance.

All of the references cited herein, including patents, patent applications, and publications, are hereby incorporated in their entireties by reference.

While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and scope of the invention as defined by the following claims.

What is claimed is:

1. A set gypsum-containing composition comprising an interlocking matrix of the set gypsum formed from at least calcined gypsum, water, and an enhancing material comprising a borate comprising ulexite, colemanite, or a mixture of ulexite and colemanite.

2. The composition of claim 1, wherein said composition is further formed from a second enhancing material comprising a polycarboxylic compound or a mixture of polycarboxylic compounds.

3. The composition of claim 1, wherein said composition is further formed from a third enhancing material comprising a polyphosphate compound or a mixture of polyphosphate compounds.

4. The composition of claim 2, wherein said composition is further formed from a third enhancing material comprising a polyphosphate compound or a mixture of polyphosphate compounds.

5. The composition of claim 2, wherein said composition further is formed from an accelerator.

6. The composition of claim 1, wherein said composition further is formed from an accelerator.

7. The composition of claim 6, wherein at least a portion of the borate is carried on the accelerator.

8. The composition of claim 7, wherein only a portion of the borate is carried on the accelerator.

9. The composition of claim 1, wherein the set gypsum is formed from about 0.01 wt. % to about 5 wt. % of enhancing material, based on the weight of the calcined gypsum.

10. The composition of claim 7, wherein said borate is ulexite.

11. The composition of claim 1, wherein said composition is further formed from a second enhancing material comprising an organic polyphosphonic compound.

12. The composition of claim 11, wherein said organic polyphosphonic compound is aminotri (methylene-phosphonic acid), aminotri (methylene-phosphonic acid) pentasodium salt, 1-hydroxyethylidene-1,1-diphosphonic acid, 1-hydroxyethylidene-1,1-diphosphonic acid tetrasodium salt, diethylenetriamine penta(methylene phosphonic acid) pentasodium salt, diethylenetriamine penta(methylene phosphonic acid) trisodium salt, hexamethylene diamine tetra(methylene phosphonic acid), or hexamethylene diamine tetra(methylene phosphonic acid) potassium salt.

13. The composition of claim 1, wherein said borate is ulexite.

14. The composition of claim 1, wherein said borate is colemanite.

15. The composition of claim 2, wherein said polycarboxylic compound has a molecular weight of from about 100,000 daltons to about 1 million daltons.

16. The composition of claim 2, wherein said polycarboxylic compound has a molecular weight of from about 400,000 daltons to about 600,000 daltons.

17. The composition of claim 2, wherein said polycarboxylic compound is selected from the group consisting of polyacrylates, polyethacrylates, and polymethacrylates.

18. The composition of claim 1, wherein said polycarboxylic compound is a polyacrylate.

19. The composition of claim 3, wherein said polyphosphate compound is selected from the group consisting of a trimetaphosphate compound, sodium hexametaphosphate having 6–27 repeating phosphate units, ammonium polyphosphate, tetrapotassium pyrophosphate, sodium tripolyphosphate, tetrasodium pyrophosphate, sodium acid pyrophosphate, and polyphosphoric acid having 2 or more repeating phosphoric acid units.

20. The composition of claim 3, wherein said third enhancing material is a trimetaphosphate compound.

21. The composition of claim 3, wherein said third enhancing material is ammonium polyphosphate.

22. The composition of claim 4, wherein said polyphosphate compound is selected from the group consisting of a trimetaphosphate compound, sodium hexametaphosphate having 6–27 repeating phosphate units, ammonium polyphosphate, tetrapotassium pyrophosphate, trisodium dipotassium tripolyphosphate, sodium tripolyphosphate, tetrasodium pryophosphate, sodium acid pyrophosphate, and polyphosphoric acid having 2 or more repeating phosphoric acid units.

23. The composition of claim 4, wherein said third enhancing material is a trimetaphosphate compound.

24. The composition of claim 4, wherein said third enhancing material is ammonium polyphosphate.

25. A gypsum board comprising an interlocking matrix of set gypsum formed from at least calcined gypsum, water, and an enhancing material comprising:
   (i) an organic polyphosphonic compound or a mixture of polyphosphonic compounds; or
   (ii) a borate comprising ulexite, colemanite, or a mixture of ulexite and colemanite; or a mixture of (i) and (ii).

26. The gypsum board of claim 25, wherein said gypsum board has a sag resistance, as determined according to ASTM C473-95, of less than about 0.1 inch per two foot length of said board.

27. The gypsum board of claim 25, wherein said gypsum board has a shrinkage of less than about 0.02 inch per four foot width and less than about 0.05 inch per twelve foot length.

28. The gypsum board of claim 25, wherein the composition is further formed from an accelerator and wherein at least a portion of the borate is carried on an accelerator.

29. The gypsum board of claim 28, wherein said gypsum board has a sag resistance, as determined according to ASTM C473-95, of less than about 0.1 inch per two foot length of said board.

30. A set gypsum-containing composition comprising an interlocking matrix of set gypsum formed from at least calcined gypsum, water, and an enhancing material comprising:
   (i) a polycarboxylic compound or a mixture of polycarboxylic compounds; and
   (ii) a polyphosphate compound or a mixture of polyphosphate compounds.

31. A set gypsum-containing composition comprising an interlocking matrix of set gypsum wherein said set gypsum has been treated with a mixture of a liquid and an enhancing material comprising:
   (i) an organic phosphonic compound or a mixture of organic phosphonic compounds;
   (ii) a borate comprising ulexite, colemanite, or a mixture of ulexite and colemanite; or
   (iii) a carboxylic compound or a mixture of carboxylic compounds;
or a mixture of any combination of (i), (ii), and (iii).

32. The set gypsum-containing composition of claim 31, wherein said composition further is treated with a second enhancing material comprising a phosphate compound or a mixture of phosphate compounds.

33. The composition of claim 31, wherein said enhancing material is an organic phosphonic compound.

34. The composition of claim 33, wherein said organic phosphonic compound is aminotri (methylene-phosphonic acid), aminotri (methylene-phosphonic acid) pentasodium salt, 1-hydroxyethylidene-1,1-diphosphonic acid, 1-hydroxyethylidene-1,1-diphosphonic acid tetrasodium salt, diethylenetriamine penta(methylene phosphonic acid) pentasodium salt, diethylenetriamine penta(methylene phosphonic acid) trisodium salt, hexamethylene diamine tetra (methylene phosphonic acid), or hexamethylene diamine tetra(methylene phosphonic acid) potassium salt.

35. The composition of claim 31, wherein said borate is ulexite.

36. The composition of claim 31, wherein said borate is colemanite.

37. The composition of claim 31, wherein said carboxylic compound is a polycarboxylic compound.

38. The composition of claim 37, wherein said polycarboxylic compound has a molecular weight of from about 200 daltons to about 1 million daltons.

39. The composition of claim 31, wherein said carboxylic compound is selected from the group consisting of polyacrylates, polyethacrylates, polymethacrylates, and citrates.

40. The composition of claim 37, wherein said polycarboxylic compound is a polyacrylate.

41. The composition of claim 32, wherein said second enhancing material is a polyphosphate compound.

42. A gypsum board comprising the composition of claim 31.

43. The gypsum board of claim 42, wherein said gypsum board has a sag resistance, as determined according to ASTM C473-95, of less than about 0.1 inch per two foot length of said board.

44. The gypsum board of claim 42, wherein said gypsum board has a shrinkage of less than about 0.02 inch per four foot width and less than about 0.05 inch per twelve foot length.

45. An accelerator for an aqueous calcined gypsum composition comprising a borate selected from the group consisting of ulexite, colemanite and a mixture of ulexite and colemanite, and an accelerator material.

46. The accelerator of claim 45, wherein the accelerator material is calcium sulfate dihydrate.

47. The accelerator of claim 45, wherein the borate and the accelerator material are provided in a milled mixture.

48. The accelerator of claim 47, wherein the milled mixture has a median particle size of less than about 5 $\mu$m.

49. The accelerator of claim 47, wherein the milled mixture has a surface area of at least about 7,000 cm$^2$/gram.

50. A set gypsum-containing composition comprising an interlocking matrix of set gypsum formed from at least calcined gypsum, water, and an enhancing material comprising:

(i) a polycarboxylic compound or a mixture of polycarboxylic compounds; and (ii) an organic polyphosphonic compound or a mixture of organic polyphosphonic compounds.

51. The composition of claim 50, wherein said polycarboxylic compound has a molecular weight of from about 100,000 daltons to about 1 million daltons.

52. The composition of claim 50, wherein said polycarboxylic compound has a molecular weight of from about 400,000 daltons to about 600,000 daltons.

53. The composition of claim 50, wherein said polycarboxylic compound is selected from the group consisting of polyacrylates, polyethacrylates, and polymethacrylates.

* * * * *